(12) United States Patent
Fujitani et al.

(10) Patent No.: US 11,424,705 B2
(45) Date of Patent: Aug. 23, 2022

(54) ELECTRIC-VEHICLE PROPULSION CONTROL SYSTEM

(71) Applicant: Mitsubishi Electric Corporation, Tokyo (JP)

(72) Inventors: Kohei Fujitani, Tokyo (JP); Shinsuke Kadoi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 412 days.

(21) Appl. No.: 16/495,700

(22) PCT Filed: Mar. 27, 2017

(86) PCT No.: PCT/JP2017/012413
§ 371 (c)(1),
(2) Date: Sep. 19, 2019

(87) PCT Pub. No.: WO2018/179058
PCT Pub. Date: Oct. 4, 2018

(65) Prior Publication Data
US 2020/0099324 A1 Mar. 26, 2020

(51) Int. Cl.
*H02P 1/24* (2006.01)
*H02P 21/22* (2016.01)
*B60L 15/02* (2006.01)
*B60L 15/20* (2006.01)
*H02P 5/74* (2006.01)

(52) U.S. Cl.
CPC ............. *H02P 21/22* (2016.02); *B60L 15/02* (2013.01); *B60L 15/20* (2013.01); *H02P 5/74* (2013.01); *B60L 2210/40* (2013.01); *B60L 2220/12* (2013.01)

(58) Field of Classification Search
CPC .. H02P 21/22; H02P 5/74; H02P 27/06; H02P 2207/01; B60L 15/02; B60L 15/20; B60L 2210/40; B60L 2220/12
See application file for complete search history.

(56) References Cited

U.S. PATENT DOCUMENTS

2012/0212168 A1 8/2012 Tsukima et al.

FOREIGN PATENT DOCUMENTS

| EP | 0594130 A1 | 4/1994 |
|---|---|---|
| JP | S56159992 A | 12/1981 |
| JP | H06141403 A | 5/1994 |
| JP | 2007104777 A | 4/2007 |
| JP | 4610950 B2 | 1/2011 |

(Continued)

OTHER PUBLICATIONS

International Search Report (PCT/ISA/210) dated Jun. 27, 2017, by the Japan Patent Office as the International Searching Authority for International Application No. PCT/JP2017/012413.

(Continued)

*Primary Examiner* — Karen Masih
(74) *Attorney, Agent, or Firm* — Buchanan Ingersoll & Rooney PC

(57) ABSTRACT

An electric-vehicle propulsion control system to drive an electric vehicle includes a plurality of motors, an inverter to apply a common voltage to the plurality of motors, and at least one opening/closing unit or opening/closing unit to enable switching between electrical opening and conduction between the inverter and at least one of the motors.

12 Claims, 11 Drawing Sheets

(56) References Cited

FOREIGN PATENT DOCUMENTS

JP          6671540 B2 *  3/2020  .............. H02P 21/22
WO     2011080823 A1     7/2011

OTHER PUBLICATIONS

Japanese Office Action (Notification of Reasons for Refusal) dated Sep. 3, 2019, issued in corresponding Japanese Patent Application No. 2019-508357, and a English Translation thereof. (6 pages).
Written Opinion (PCT/ISA/237) dated Jun. 27, 2017, by the Japan Patent Office as the International Searching Authority for International Application No. PCT/JP2017/012413.

* cited by examiner

ELECTRIC-VEHICLE PROPULSION CONTROL SYSTEM

FIELD

The present invention relates to an electric-vehicle propulsion control system for driving an electric vehicle.

BACKGROUND

Drive methods by which electric-vehicle propulsion control systems drive electric vehicles include an individual control method in which one motor is driven per inverter and a collective control method in which a plurality of motors are driven per inverter. Motors mounted on electric vehicles include synchronous machines and asynchronous machines. Synchronous machines have the restriction that the frequency of applied voltage must agree with the rotational frequency. In contrast, induction motors, a typical example of asynchronous machines, can generate torque by "slip" and thus do not have the restriction that the frequency of applied voltage must agree with the rotational frequency.

The wheels of an electric vehicle serving as a railway vehicle are affected by a factor such as wear or grinding. As a result, differences in wheel diameter arise among the wheels. When differences in wheel diameter have arisen, the numbers of revolutions of the wheels, that is, the rotational frequencies become different. Therefore, electric vehicles equipped with synchronous machines use the individual control method. On the other hand, electric vehicles equipped with induction motors generally use the collective control method that allows a reduction in the number of devices. A railway vehicle control apparatus disclosed in Patent Literature 1 described below also uses the collective control method.

CITATION LIST

Patent Literature

Patent Literature 1: Japanese Patent No. 4610950

SUMMARY

Technical Problem

However, in the collective control method, the same voltage is applied to a plurality of motors. Thus, the collective control method cannot stop only some of the motors, let alone control the driving forces of the motors individually. Examples where the need to stop only some of the motors arises include a case where selective powering as disclosed in Patent Literature 1 is performed. Selective powering is a propulsion control method for operating motors under more power-efficient conditions by reducing the number of operating inverters on an entire electric vehicle made up of one or more vehicles, and increasing a driving force allotted to each motor, when a driving force required for the entire electric vehicle is well within the maximum driving force that can be supplied by the electric-vehicle propulsion control system.

Patent Literature 1 discloses a method of stopping and restarting power units, according to a driving force required in the entire electric vehicle. However, stopping and restarting are performed on an individual power unit basis. When the number of motors driven by one power unit is four, for example, the number of motors to be operated can be selected only at least in fours. Thus, there is a problem with a low degree of freedom in selective powering.

The present invention has been made in view of the above. It is an object of the present invention to provide an electric-vehicle propulsion control system capable of turning on or off the driving force of each of a plurality of motors individually, even using a collective control method in which the motors are driven by one inverter.

Solution to Problem

In order to solve the above-described problem and achieve the object, an electric-vehicle propulsion control system for driving an electric vehicle according to an aspect of the present invention includes: a plurality of induction motors; an inverter to apply a common voltage to the plurality of induction motors; and at least one opening/closing unit to enable switching between electrical opening and conduction between the inverter and at least one of the induction motors.

Advantageous Effects of Invention

The present invention has the advantage of being able to turn on or off the driving force of each of a plurality of induction motors individually, even using a collective control method in which one inverter drives the induction motors.

DESCRIPTION OF EMBODIMENTS

Hereinafter, an electric-vehicle propulsion control system according to embodiments of the present invention will be described in detail with reference to the drawings. Note that the following embodiments are not intended to limit the present invention.

First Embodiment

Figure 1:
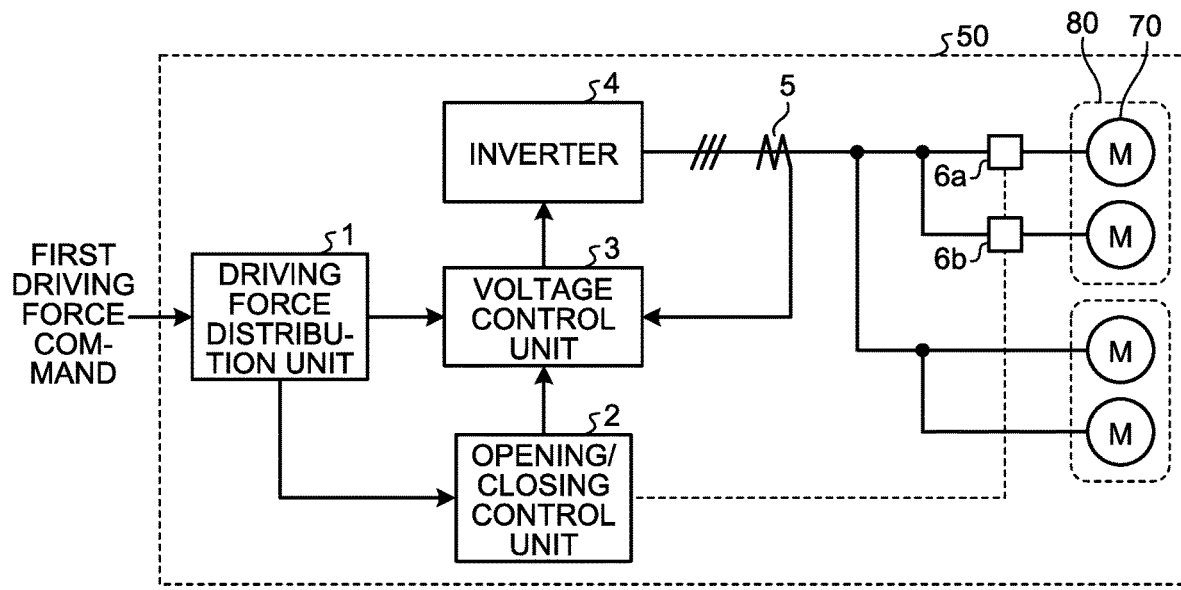
FIG. 1 is a block diagram illustrating the configuration of an electric-vehicle propulsion control system according to a first embodiment.

FIG. 1 is a block diagram illustrating the configuration of an electric-vehicle propulsion control system according to a first embodiment. An electric-vehicle propulsion control system 50 is a system for the propulsion control of an electric vehicle. As illustrated in FIG. 1, the electric-vehicle propulsion control system 50 includes a plurality of motors 70 that are induction motors mounted on an electric vehicle, an inverter 4 that is a power converter for applying a common voltage to the plurality of motors 70, and opening/closing units 6a and 6b that enable switching between electrical opening and conduction between the inverter 4 and at least one of the motors 70.

FIG. 1 illustrates an example configuration in which two of the motors 70 are mounted on one bogie 80. Axles not illustrated in FIG. 1 at each bogie 80 are driven by the two motors 70 mounted on the bogie 80. FIG. 1 illustrates an example configuration in which the single inverter 4 drives the four motors 70 and each of the two opening/closing units 6a and 6b switches one of the motors 70 between electrical opening and conduction. In the first embodiment, it is only essential that at least one of the motors 70 can be switched between electrical opening and conduction. One of the opening/closing units 6a and 6b may be omitted.

The electric-vehicle propulsion control system 50 according to the first embodiment uses a collective control method in which the single inverter 4 drives the four motors 70 as illustrated in the drawing. The number of motors 70 driven by the single inverter 4 is not limited to four, and may be two, three, or five or more.

The electric-vehicle propulsion control system 50 also includes a current detector 5 disposed on the output side of the inverter 4. The current detector 5 detects a motor current supplied to the four motors 70, that is, the total value of current flowing through the four motors 70.

The electric-vehicle propulsion control system 50 further includes a voltage control unit 3 that controls the output voltage of the inverter 4 on the basis of a detection value of the current detector 5, an opening/closing control unit 2 that controls the electrical opening and conduction states of the opening/closing units 6a and 6b, and a driving force distribution unit 1 that calculates the number of motors 70 to be operated and a driving force per motor on the basis of a first driving force command. Here, the first driving force command contains information on the total value of driving force to be exerted by the single inverter 4. The opening/closing control unit 2 performs control to switch the opening/closing units 6a and 6b between the electrical opening and conduction states on the basis of the number of motors to be operated calculated by the driving force distribution unit 1.

The first driving force command that is instruction information to the driving force distribution unit 1 corresponds to a selective powering command used in the conventional selective powering. That is, the electric-vehicle propulsion control system according to the present embodiment including embodiments described later is configured to be able to use the conventional selective powering control as well. When selective powering control according to the present embodiment is not performed, a driving force command for the driving force distribution unit 1 is passed through the driving force distribution unit 1, that is, transmitted to the voltage control unit 3 without processing of the driving force distribution unit 1, and the voltage control unit 3 performs the conventional selective powering control, that is, selective powering control to perform stop and restart on an individual power unit basis.

Figure 2:
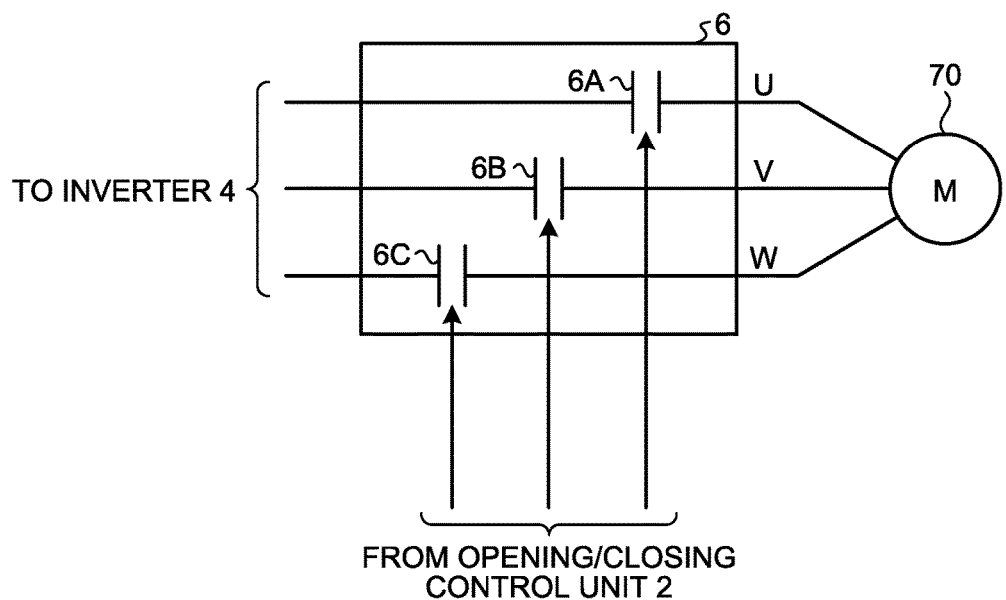
FIG. 2 is a diagram schematically illustrating the internal structure of an opening/closing unit illustrated in FIG. 1.

FIG. 2 is a diagram schematically illustrating the internal structure of each opening/closing unit 6 illustrated in FIG. 1. The opening/closing unit 6 includes a contactor 6A placed in a U-phase power line, a contactor 6B placed in a V-phase power line, and a contactor 6C placed in a W-phase power line. The three contactors 6A, 6B, and 6C can collectively switch three phases, between the motor 70 that is a three-phase induction motor and the inverter 4, between the electrical opening and conduction states. FIG. 2 illustrates the opening/closing unit 6 including the three contactors 6A, 6B, and 6C. When the motor 70 that is a three-phase induction motor is used, one of the three contactors 6A, 6B, and 6C may be omitted. In a three-phase motor, opening contacts of at least two phases can interrupt current. Thus, by using the opening/closing unit 6 with two contacts, the opening/closing unit 6 can be formed to be small in size and low in cost. For a Permanent Magnet Synchronous Motor (PMSM) representing a synchronous motor, a three-contact opening/closing unit is recommended in terms of ground-fault protection. For an induction motor, which does not have induced voltage, two contacts will suffice.

Figure 3:
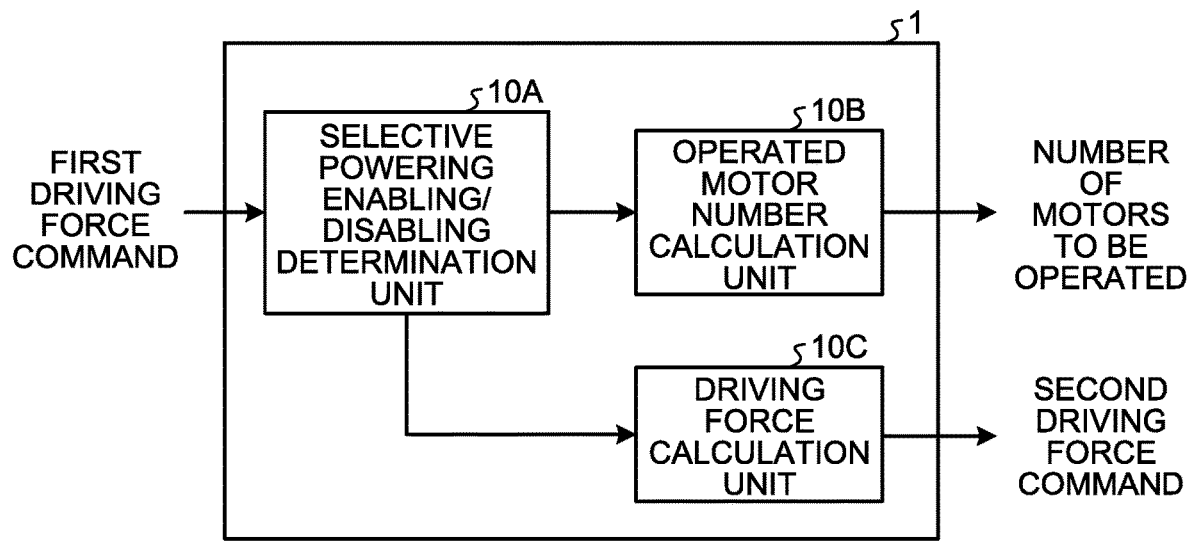
FIG. 3 is a block diagram illustrating the detailed configuration of a driving force distribution unit in the first embodiment.

FIG. 3 is a block diagram illustrating the detailed configuration of the driving force distribution unit 1 in the first embodiment. As illustrated in FIG. 3, the driving force distribution unit 1 includes a selective powering enabling/disabling determination unit 10A that determines whether to perform the selective powering according to the present embodiment, in other words, whether to enable or disable the selective powering according to the present embodiment, an operated motor number calculation unit 10B that determines the number of motors 70 to be operated, on the basis of the input first driving force command, that is, the driving force per inverter when the selective powering according to the present embodiment is enabled, and a driving force calculation unit 10C that calculates a driving force per motor on the basis of the number of motors 70 to be operated. The number of motors to be operated calculated by the operated motor number calculation unit 10B is transmitted to the opening/closing control unit 2 illustrated in FIG. 1. A second driving force command is generated on the basis of the driving force per motor calculated by the driving force calculation unit 10C. The generated second driving force command is transmitted to the voltage control unit 3 illustrated in FIG. 1.

Figure 4:
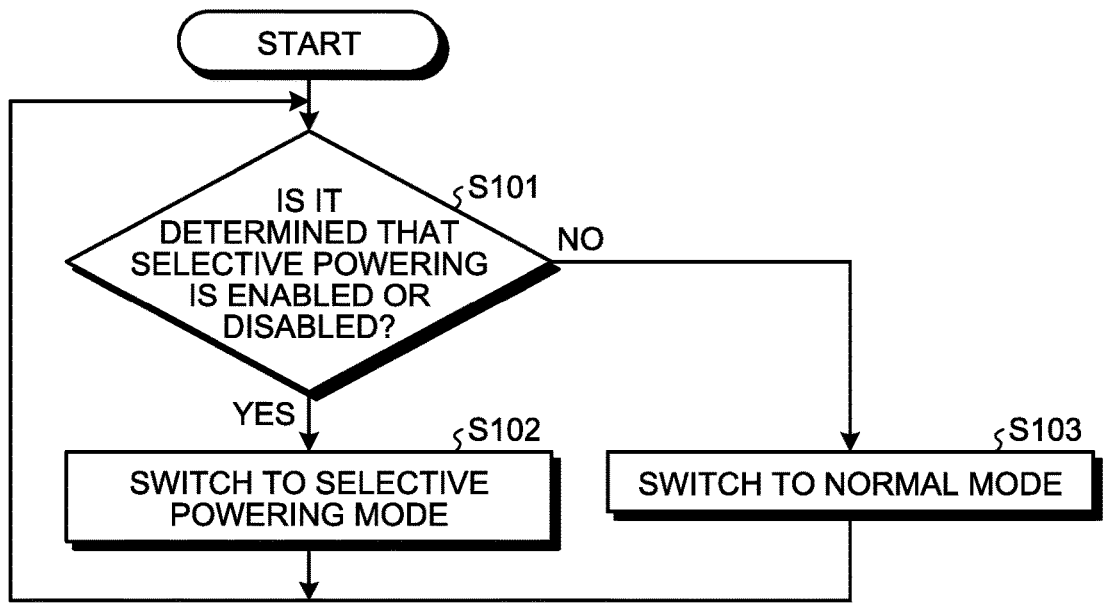
FIG. 4 is a flowchart on switching between operation modes in the electric-vehicle propulsion control system in the first embodiment.

FIG. 4 is a flowchart on switching between operation modes in the electric-vehicle propulsion control system 50. A processing flow illustrated in FIG. 4 is executed by the selective powering enabling/disabling determination unit 10A illustrated in FIG. 3. First, in step S101, the selective powering enabling/disabling determination unit 10A determines whether to enable the selective powering control or disable the selective powering control. The determination of whether to enable or disable the selective powering control can be made on the basis of instruction information from outside.

When it is determined that the selective powering control is enabled (step S101, Yes), the operation switches to a selective powering mode (step S102). In contrast, when it is determined that the selective powering control is disabled (step S101, No), the operation switches to a normal mode (step S103). The selective powering mode is a mode in which the selective powering control is performed. The normal mode is a mode in which the selective powering control is not performed.

Figure 5:
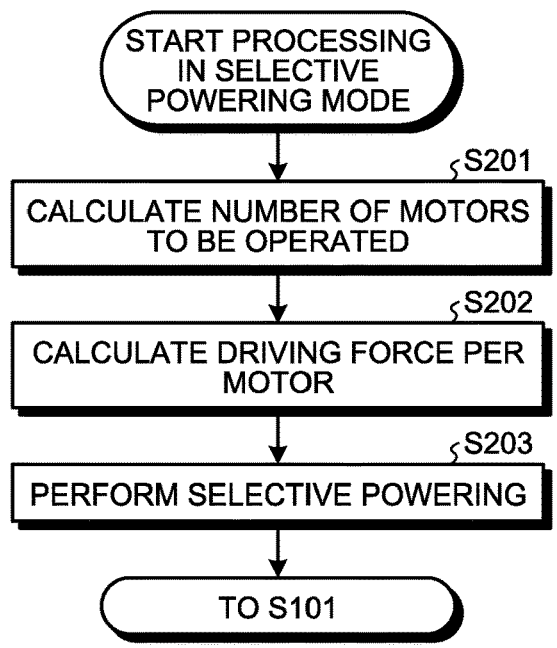
FIG. 5 is a flowchart on processing in a selective powering mode in the first embodiment.

FIG. 5 is a flowchart on processing in the selective powering mode in the first embodiment. A processing flow illustrated in FIG. 5 consists of three pieces of processing from step S201 to step S203. First, the processing in step S201 is executed by the operated motor number calculation unit 10B. In step S201, the operated motor number calculation unit 10B calculates the number of motors 70 to be operated, on the basis of the driving force per inverter. The details of the processing to calculate the number of motors 70 to be operated will be described later.

The processing in next step S202 is executed by the driving force calculation unit 10C. In step S202, the driving force calculation unit 10C calculates a driving force per motor on the basis of the driving force per inverter and the number of motors to be operated determined in step S201.

In step S203, the driving force calculation unit 10C generates a second driving force command on the basis of the calculated driving force per motor, and gives it to the voltage control unit 3. Also, in step S203, information on the number of motors to be operated is transmitted to the opening/closing control unit 2. Thereafter, by the control of the voltage control unit 3 and the opening/closing control unit 2, the selective powering control according to the present embodiment is performed.

Figure 6:
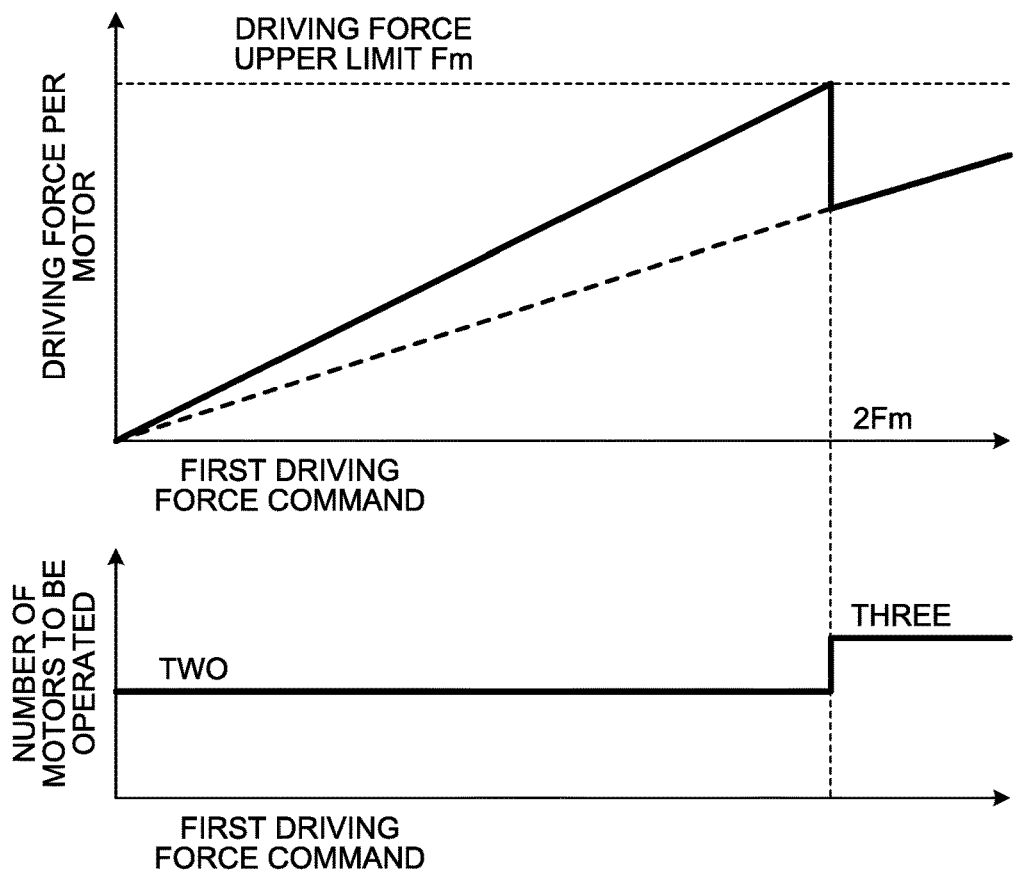
FIG. 6 is a graph for explaining a method of calculating the number of motors to be operated in the first embodiment.

FIG. 6 is a graph for explaining a method of calculating the number of motors to be operated in the first embodiment. In FIG. 6, the upper-row part illustrates the driving force per motor relative to the first driving force command and the lower-row part illustrates the number of motors to be operated relative to the first driving force command.

As also illustrated in FIG. 6, let Fm be the upper limit of the driving force that can be output by each motor 70. Meanwhile, in the configuration of FIG. 1, the opening/closing units 6a and 6b are provided only to one bogie 80 of the two bogies 80. Thus, the minimum number of motors 70 driven is two. Therefore, the number of motors to be operated is set to two until the first driving force command becomes 2Fm that is twice the upper limit Fm, and the number of motors to be operated is increased by one and set to three when the first driving force command exceeds 2Fm. Although not illustrated in FIG. 6, it goes without saying that the number of motors to be operated is set to four when the first driving force command exceeds 3Fm that is three times the upper limit Fm.

The number of motors 70 to be operated can be calculated by rounding up to the nearest integer the fractional portion of the value of the quotient of the driving force indicated by the first driving force command divided by the driving force upper limit Fm.

In the configuration of FIG. 1, when the number of motors to be operated is two, the opening/closing units 6a and 6b are opened. Consequently, only the two motors 70 not connected to the opening/closing units 6a and 6b are driven. When the number of motors to be operated is three, one of the opening/closing units 6a and 6b is opened. Consequently, three of the motors 70 are driven. When the number of motors to be operated is four, both of the opening/closing units 6a and 6b are closed to conduct and the four motors 70 are driven.

Thus, the electric-vehicle propulsion control system according to the first embodiment can turn on or off the driving forces of two or more motors individually, one by one, even using the collective control method in which one inverter drives a plurality of motors. Consequently, motors can be driven by taking torque-efficiency characteristics into consideration, and the overall efficiency of motor drive can be enhanced.

Second Embodiment

Figure 7:
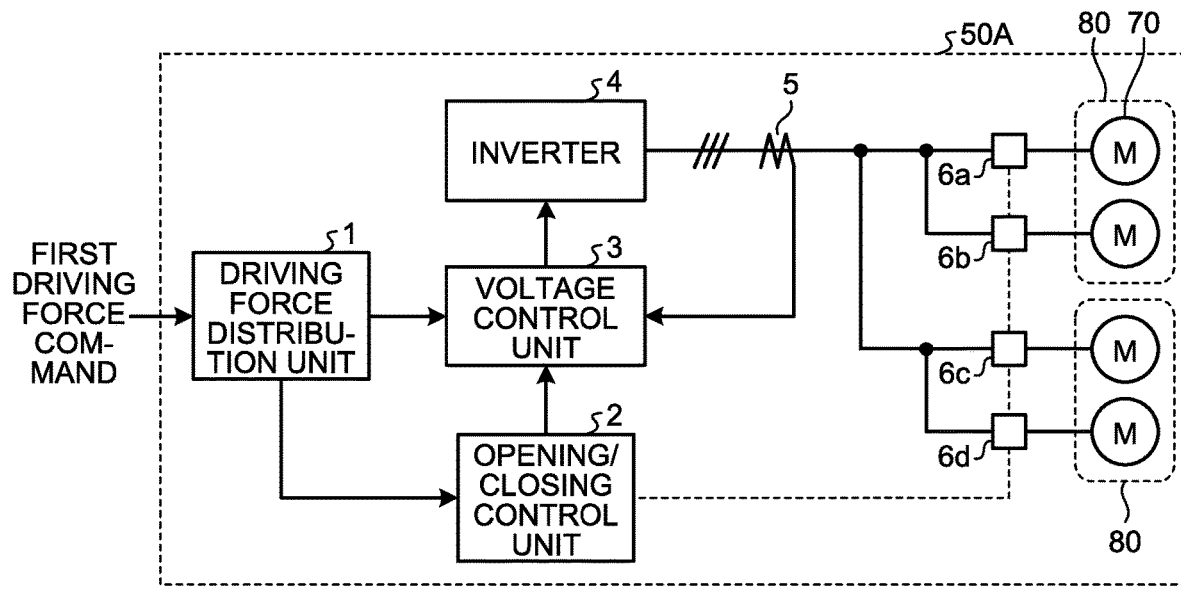
FIG. 7 is a block diagram illustrating the configuration of an electric-vehicle propulsion control system according to a second embodiment.

FIG. 7 is a block diagram illustrating the configuration of an electric-vehicle propulsion control system according to a second embodiment. In the electric-vehicle propulsion control system 50 according to the first embodiment illustrated in FIG. 1, the opening/closing units 6a and 6b are provided only to one bogie 80 of the two bogies 80. In contrast, in an electric-vehicle propulsion control system 50A according to the second embodiment, opening/closing units 6c and 6d are provided also to the other bogie 80. That is, in the electric-vehicle propulsion control system 50A according to the second embodiment, the opening/closing units 6a to 6d are provided between the inverter 4 and all the motors 70. The other configuration is the same as or equivalent to that of the first embodiment. The same reference numerals are assigned to the same or equivalent components without duplicated explanations.

Figure 8:
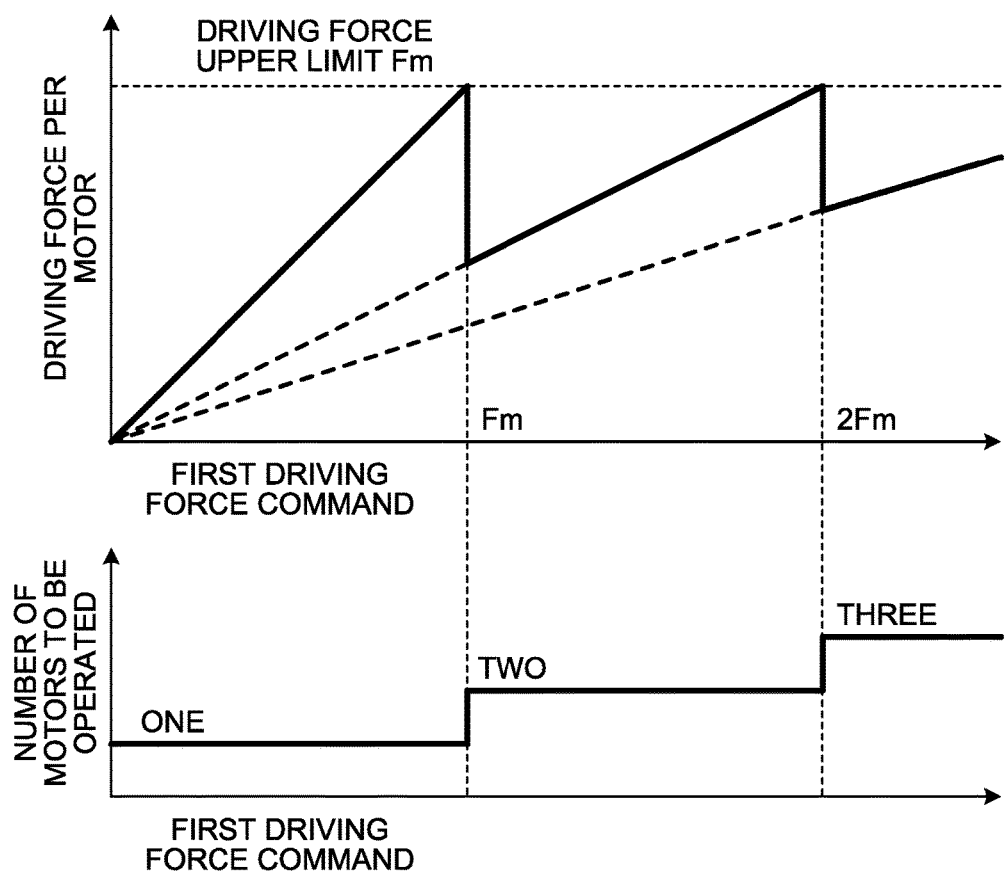
FIG. 8 is a graph for explaining a method of calculating the number of motors to be operated in the second embodiment.

FIG. 8 is a graph for explaining a method of calculating the number of motors to be operated in the second embodiment. In FIG. 8, the upper-row part illustrates the driving force per motor relative to the first driving force command and the lower-row part illustrates the number of motors to be operated relative to the first driving force command.

In the configuration of FIG. 7, the opening/closing units 6a to 6d are disposed at all the motors 70, so that the minimum number of motors 70 driven is one. Therefore, the number of motors to be operated is set to one until the first driving force command becomes the upper limit Fm, and the number of motors to be operated is set to two when the first driving force command exceeds the upper limit Fm, and further the number of motors to be operated is set to three when the first driving force command exceeds 2Fm that is twice the upper limit Fm. Although not illustrated in FIG. 8, it goes without saying that the number of motors to be operated is set to four when the first driving force command exceeds 3Fm that is three times the upper limit Fm.

In the configuration of FIG. 7, when the number of motors to be operated is one, three of the opening/closing units 6a to 6d are opened. Consequently, only one of the motors 70 is driven. When the number of motors to be operated is two, two of the opening/closing units 6a to 6d are opened. Consequently, two of the motors 70 are driven. When the number of motors to be operated is three, one of the opening/closing units 6a to 6d is opened. Consequently, three of the motors 70 are driven. When the number of motors to be operated is four, all of the opening/closing units 6a to 6d are closed to conduct, and the four motors 70 are driven.

Thus, the electric-vehicle propulsion control system according to the second embodiment can turn on or off the driving forces of motors individually, one by one, even using the collective control method in which one inverter drives a plurality of motors. Consequently, motors can be driven by taking torque-efficiency characteristics into consideration, and the overall efficiency of motor drive can be enhanced.

Further, the electric-vehicle propulsion control system according to the second embodiment, in which the opening/closing units are disposed for all the motors to enable individual control of the electrical opening and conduction states, can selectively drive a desired motor(s) and can level out the operating rates of the motors driven.

Third Embodiment

Figure 9:
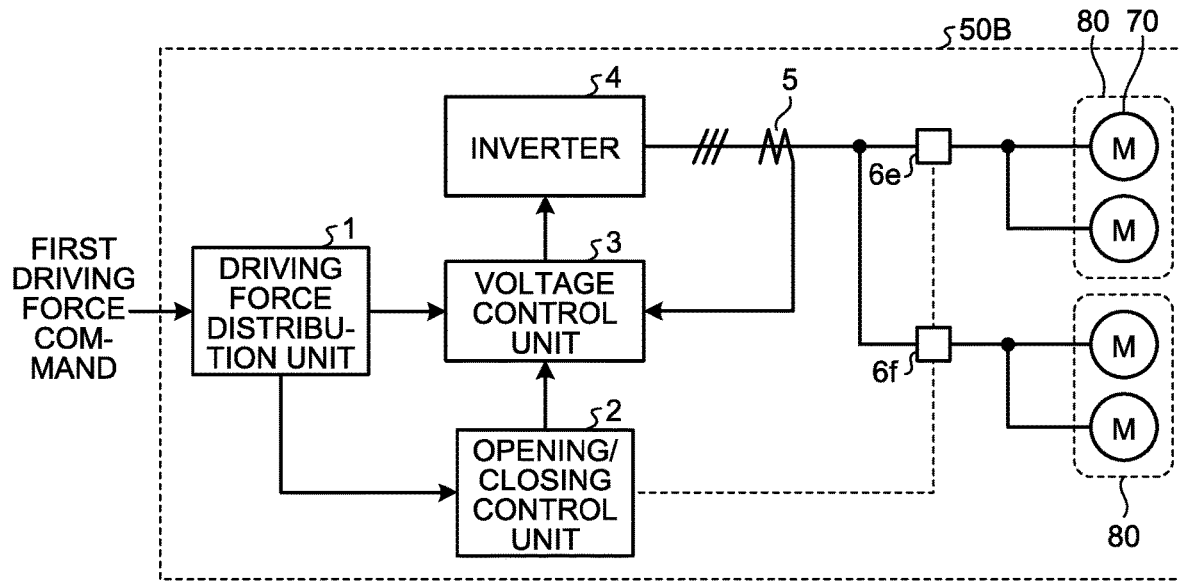
FIG. 9 is a block diagram illustrating the configuration of an electric-vehicle propulsion control system according to a third embodiment.

FIG. 9 is a block diagram illustrating the configuration of an electric-vehicle propulsion control system according to a third embodiment. In the electric-vehicle propulsion control system 50A according to the second embodiment illustrated in FIG. 7, the opening/closing units 6a to 6d are provided to all the motors 70 on a motor-by-motor basis. In contrast, in an electric-vehicle propulsion control system 50B according to the third embodiment, opening/closing units 6e and 6f are provided to all the bogies 80 on a bogie-by-bogie basis. The other configuration is the same as or equivalent to that of the second embodiment. The same reference numerals are assigned to the same or equivalent components without duplicated explanations. In the third embodiment, it is only essential that the motors 70 mounted on at least one of the bogies 80 can be switched between electrical opening and conduction. One of the opening/closing units 6e and 6f may be omitted.

Figure 10:
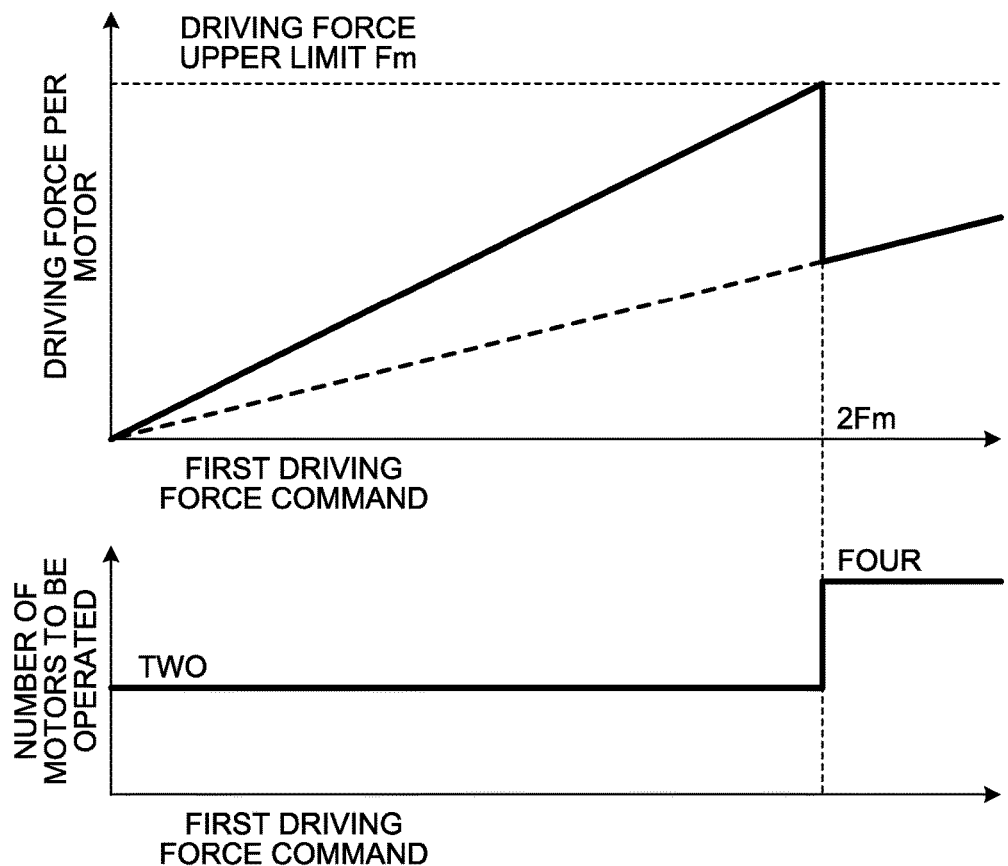
FIG. 10 is a graph for explaining a method of calculating the number of motors to be operated in the third embodiment.

FIG. 10 is a graph for explaining a method of calculating the number of motors to be operated in the third embodiment. In FIG. 10, the upper-row part illustrates the driving force per motor relative to the first driving force command and the lower-row part illustrates the number of motors to be operated relative to the first driving force command.

In the configuration of FIG. 9, the opening/closing units 6e and 6f are disposed on a bogie 80 by bogie 80 basis, so that the minimum number of motors 70 driven is two. Therefore, the number of motors to be operated is set to two until the first driving force command becomes the upper limit Fm, and the number of motors to be operated is set to four when the first driving force command exceeds 2Fm that is twice the upper limit Fm.

In the configuration of FIG. 9, when the number of motors to be operated is two, one of the opening/closing units 6e and 6f is opened. Consequently, the two motors 70 connected to the opening/closing unit not opened are driven. When the number of motors to be operated is four, both of the opening/closing units 6e and 6f are closed to conduct, and the four motors 70 are driven.

Figure 11:
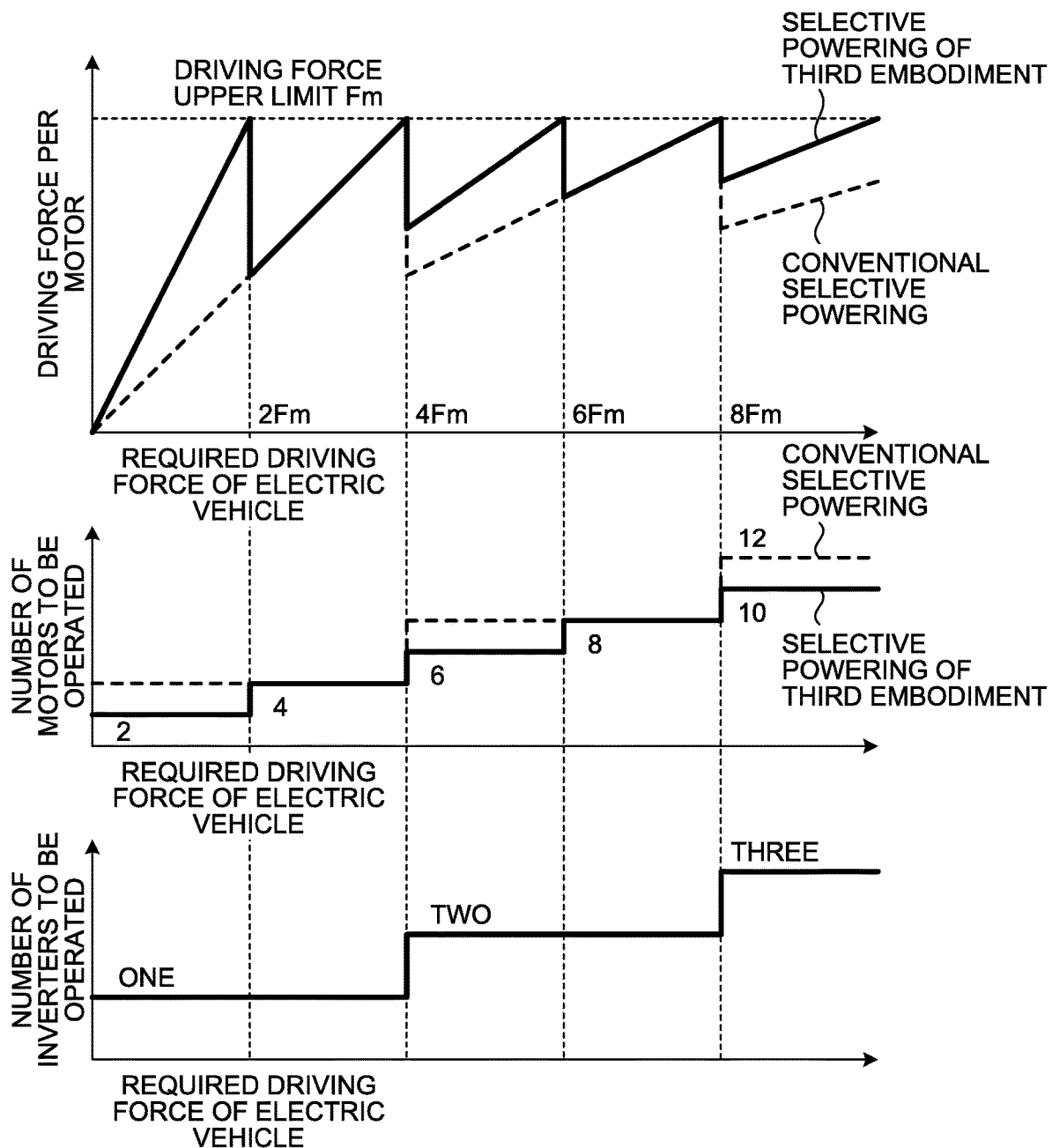
FIG. 11 is a graph explaining, in comparison, selective powering of the third embodiment and conventional selective powering.

FIG. 11 is a graph explaining, in comparison, selective powering of the third embodiment and the conventional selective powering. In FIG. 11, solid lines represent waveforms related to the selective powering of the third embodiment and broken lines represent waveforms related to the conventional selective powering. FIG. 11 illustrates, from the upper-row part to the lower-row part, the driving force per motor, the number of motors to be operated, and the number of inverters to be operated.

Focusing on the waveforms in the middle-row part of FIG. 11, the following is illustrated.

(1) When the required driving force of the electric vehicle is over zero to 2Fm or less The conventional selective powering requires the driving of four motors, whereas the selective powering of the third embodiment requires the driving of only two motors.

(2) When the required driving force of the electric vehicle is over 4Fm to 6Fm or less The conventional selective powering requires the driving of eight motors, whereas the selective powering of the third embodiment requires the driving of only six motors.

(3) When the required driving force of the electric vehicle is over 8Fm to 10Fm or less The conventional selective powering requires the driving of twelve motors, whereas the selective powering of the third embodiment requires the driving of only ten motors.

As described above, the electric-vehicle propulsion control system according to the third embodiment can turn on or off the driving forces of motors separately two by two, even using the collective control method in which one inverter drives a plurality of motors. Consequently, motors can be driven by taking torque-efficiency characteristics into consideration, and the overall efficiency of motor drive can be enhanced.

Further, the electric-vehicle propulsion control system according to the third embodiment, in which the opening/closing units are disposed on a bogie-by-bogie basis, can level out the operating rates of the motors driven while reducing the number of opening/closing units.

Fourth Embodiment

Figure 12:
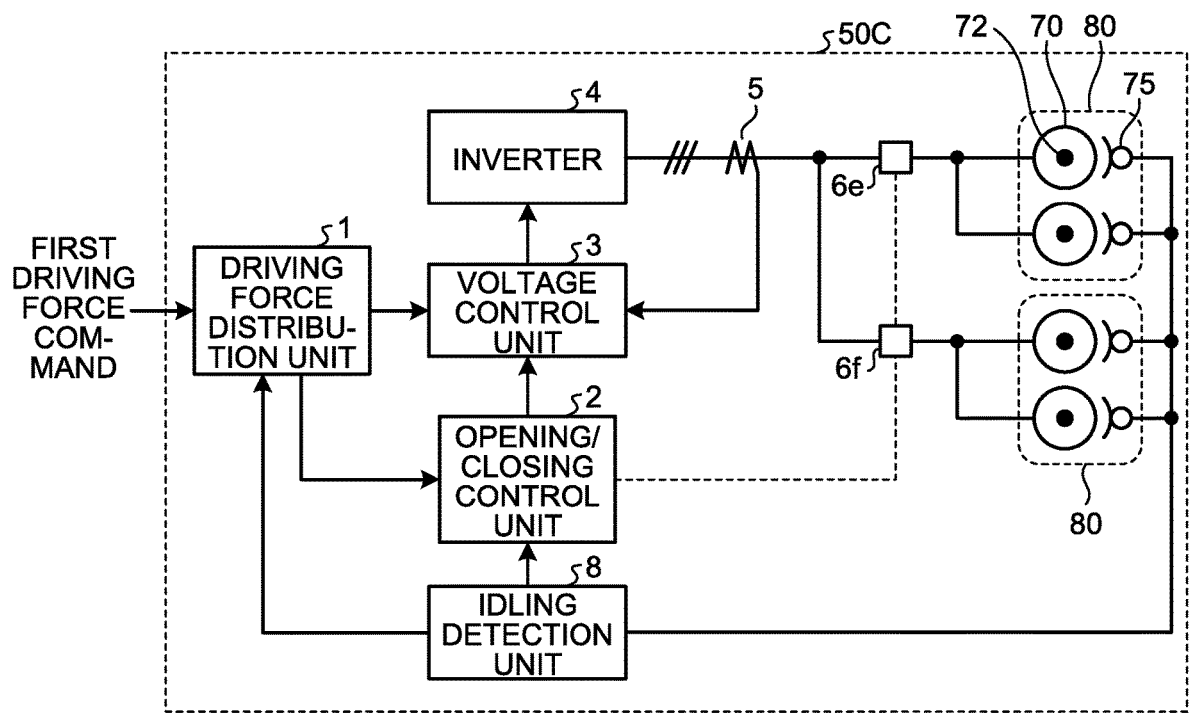
FIG. 12 is a block diagram illustrating the configuration of an electric-vehicle propulsion control system according to a fourth embodiment.

FIG. 12 is a block diagram illustrating the configuration of an electric-vehicle propulsion control system according to a fourth embodiment. An electric-vehicle propulsion control system 50C according to the fourth embodiment further includes an idling detection unit 8 for detecting the idling of the motors 70 in the configuration of the electric-vehicle propulsion control system 50B according to the third embodiment illustrated in FIG. 9. Rotation sensors 75 for detecting the rotational frequencies of the motors 70 are attached to the motors 70. The idling detection unit 8 has the function of detecting the idling of the motors 70 on the basis of the rotational frequencies of the motors 70 detected by the rotation sensors 75. The other configuration is the same as or equivalent to that of the third embodiment. The same reference numerals are assigned to the same or equivalent components without duplicated explanations.

Figure 13:
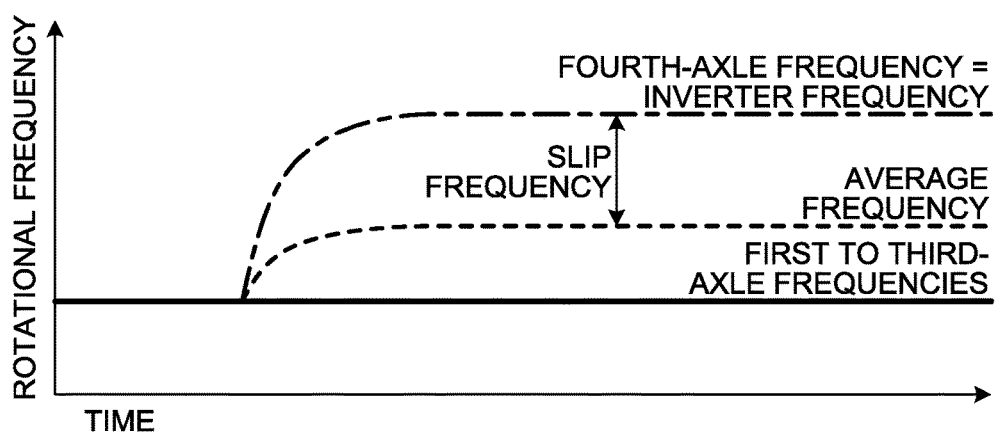
FIG. 13 is a graph illustrating how rotational frequency changes when continuous idling has occurred at one axle of four axles driven by four motors mounted on two bogies.

FIG. 13 is a graph illustrating how rotational frequency changes when continuous idling has occurred at one motor 70 of the four motors 70 mounted on the two bogies 80. FIG. 13, where axles 72 coupled to the four motors 70 are represented by a first axle, a second axle, a third axle, and a fourth axle, individually, illustrates that continuous idling has occurred at the fourth axle. Here, the rotational frequency of the first axle is referred to as a "first-axle frequency". The rotational frequencies of the second to fourth axles are referred to in a similar manner. The continuous idling includes, for example, a case where a failure has occurred in a power transmission mechanism that transmits a driving force generated by the motor 70 to the axle 72.

In FIG. 13, a solid line represents the first to third-axle frequencies. Since no continuous idling is occurring at the first to third axles, the rotational frequencies remain stable. A broken line represents the average frequency obtained by taking the average value of the first to fourth-axle frequencies. Since it is assumed that continuous idling has occurred at the fourth axle, the average frequency of all the axles is larger than each of the first to third-axle frequencies and smaller than the fourth-axle frequency represented by a dot-and-dash line. An axle at which continuous idling is occurring is equivalent to being driven at no load. Thus, the fourth-axle frequency is equal to the inverter frequency, and the inverter frequency is equal to the sum of the average frequency of all the axles and the slip frequency. Due to these relationships, the difference between the fourth-axle frequency and the average frequency is the slip frequency.

Here, an example of idling detection will be described. The idling detection unit 8 calculates the largest value of the first to fourth-axle frequencies and the smallest value of the first to fourth-axle frequencies. When the difference between the largest value and the smallest value is larger than a threshold value, the idling detection unit 8 determines that idling is occurring. In this example, the slip frequency can be used as the threshold value for the determination of idling.

Referring back to FIG. 12, the result of determination by the idling detection unit 8 is input to the opening/closing control unit 2. When it has been determined that idling is occurring, the opening/closing control unit 2 performs control to open the opening/closing unit disposed for the bogie 80 including the motor 70 on which it has been determined that idling is occurring. Consequently, even when a mechanical failure has occurred, the motor of an axle at which the mechanical failure has occurred can be electrically isolated.

The result of determination by the idling detection unit 8 is also input to the driving force distribution unit 1. The driving force distribution unit 1 calculates the number of motors 70 to be operated and a driving force per motor such that the first driving force command is shared only by the remaining motors 70 except the motor 70 on which it has been determined that idling is occurring. This enables the provision of an appropriate driving force to the electric vehicle by the remaining motors at which idling is not occurring.

Fifth Embodiment

Figure 14:
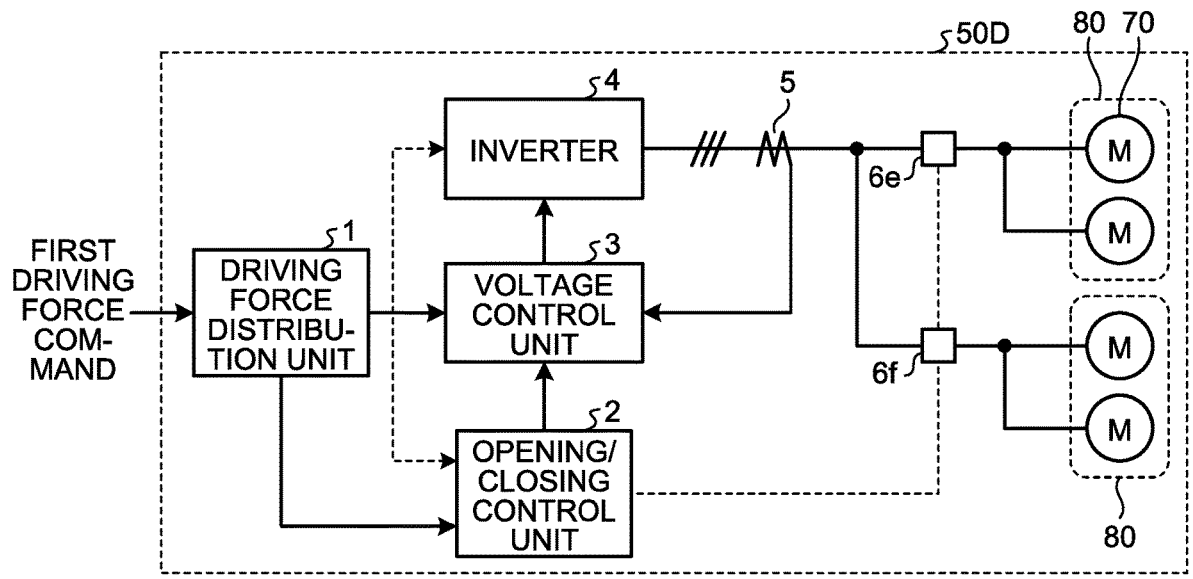
FIG. 14 is a block diagram illustrating the configuration of an electric-vehicle propulsion control system according to a fifth embodiment.

FIG. 14 is a block diagram illustrating the configuration of an electric-vehicle propulsion control system according to a fifth embodiment. An electric-vehicle propulsion control system 50D according to the fifth embodiment has the function of coordination between gate-on and gate-off control on the inverter 4 and the opening and closing control of the opening/closing units performed by the opening/closing control unit 2, added to the configuration of the electric-vehicle propulsion control system 50B according to the third embodiment illustrated in FIG. 9. The basic configuration is the same as or equivalent to the configuration of the third embodiment. The same reference numerals are assigned to the same or equivalent components without duplicated explanations.

Figure 15:
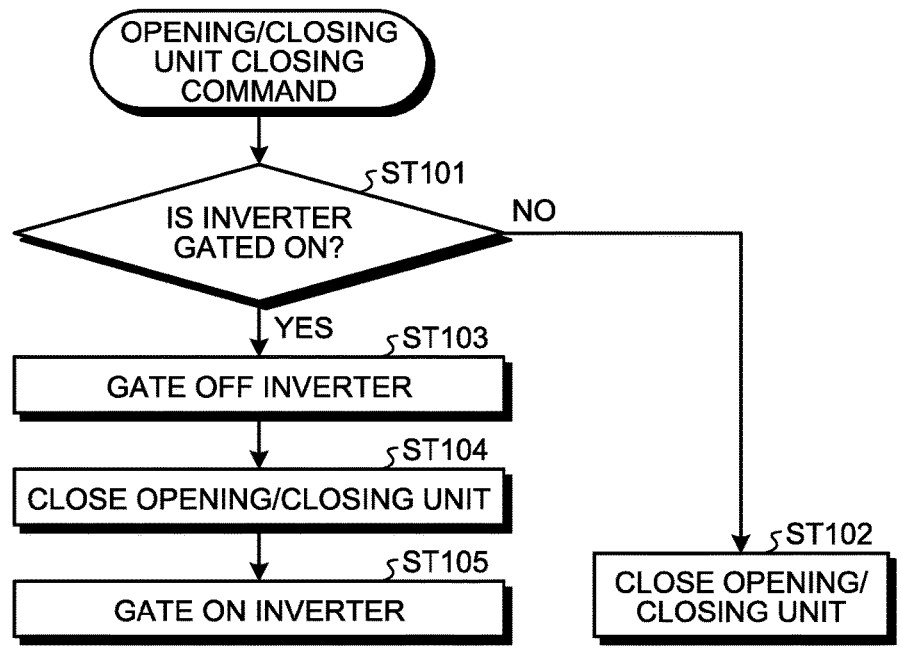
FIG. 15 is a first flowchart illustrating a processing sequence of an opening/closing unit closing command in the fifth embodiment.

FIG. 15 is a first flowchart illustrating a processing sequence of an opening/closing unit closing command in the fifth embodiment. FIG. 15 illustrates the processing sequence of the opening/closing unit closing command that takes into consideration the gate-on and gate-off of the inverter 4. In FIG. 15, first, it is determined whether the inverter 4 is in a gate-on state (step ST101). If the inverter 4 is not gated on (step ST101, No), the closing command is output to an opening/closing unit to be closed (step ST102). In contrast, if the inverter 4 is gated on (step ST101, Yes), the inverter 4 is temporarily gated off (step ST103), and then the closing command is output to an opening/closing unit to be closed (step ST104). Thereafter, the inverter 4 is gated on again (step ST105).

According to the processing sequence illustrated in FIG. 15, when a closing command is output to an opening/closing unit to be closed, the inverter 4 is temporarily gated off, so that inrush current can be prevented from occurring at the motors 70.

Figure 16:
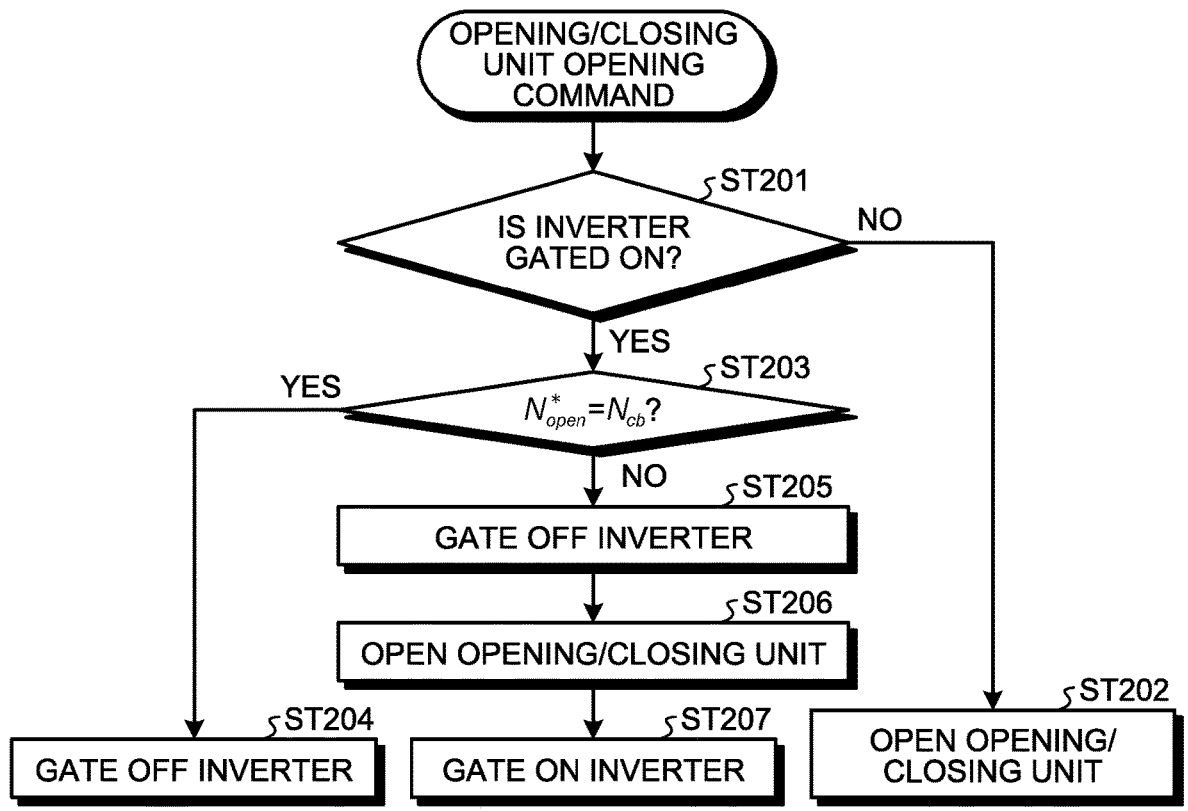
FIG. 16 is a second flowchart illustrating a processing sequence of an opening/closing unit opening command in the fifth embodiment.

FIG. 16 is a second flowchart illustrating a processing sequence of an opening/closing unit opening command in the fifth embodiment. FIG. 16 illustrates the processing sequence different from that in FIG. 15 of the opening/closing unit closing command that takes into consideration the gate-on and gate-off of the inverter 4. In FIG. 16, $N_{cb}$ is the total number of opening/closing units and $N^*_{open}$ is the number of opening/closing units instructed to open by the opening/closing control unit 2.

In FIG. 16, first, it is determined whether the inverter 4 is in the gate-on state (step ST201). If the inverter 4 is not gated on (step ST201, No), the opening command is output to an opening/closing unit to be opened (step ST202). In contrast, if the inverter 4 is gated on (step ST201, Yes), it is determined whether $N^*_{open}$ is equal to $N_{cb}$, that is, whether the opening command has been output to all the opening/closing units (step ST203). Here, when the opening command has been output to all the opening/closing units (step ST203, Yes), the inverter 4 is gated off (step ST204). In contrast, when the opening command has not been output to all the opening/closing units (step ST203, No), the inverter 4 is temporarily gated off (step ST205), and then the opening command is output to an opening/closing unit to be opened (step ST206). Thereafter, the inverter 4 is gated on again (step ST207).

According to the processing sequence illustrated in FIG. 16, when an opening command is output to an opening/closing unit to be opened, the inverter 4 is temporarily gated off. Thus, when the number of motors 70 to be operated changes, unintended fluctuations can be prevented from occurring in the total driving force of the motors 70. Further, according to the processing sequence illustrated in FIG. 16, when all the opening/closing units are opened, the inverter 4 is gated off without switching the states of the opening/closing units, so that the number of operations of the opening/closing units can be reduced, and the life of the opening/closing units can be extended.

Figure 17:
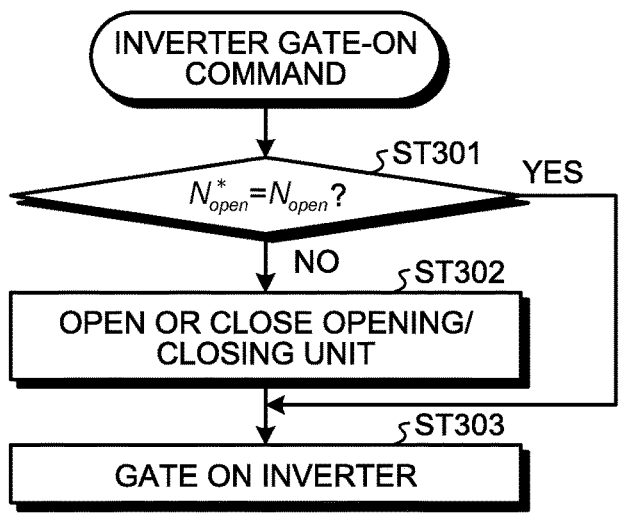
FIG. 17 is a third flowchart illustrating a processing sequence of an inverter gate-on command in the fifth embodiment.

FIG. 17 is a third flowchart illustrating a processing sequence of an inverter gate-on command in the fifth embodiment. FIG. 17 illustrates the processing sequence of the inverter gate-on command that takes into consideration the opening/closing unit closing command and the opening/closing unit opening command at the gate-start of the inverter 4. In FIG. 17, $N^*_{open}$ is the number of opening/ closing units that have been instructed to open by the opening/closing control unit 2 and $N_{open}$ is the number of opening/closing units in an open state which have been instructed to open.

In FIG. 17, first, it is determined whether $N^*_{open}$ is equal to $N_{open}$, that is, whether all the opening/closing units that have been instructed to open are in the open state (step ST301). Here, when all the opening/closing units that have been instructed to open are in the open state (step ST301, Yes), the inverter 4 is gated on (step ST303). In contrast, when all the opening/closing units that have been instructed to open are not in the open state (step ST301, No), an opening/closing unit to be opened is opened or an opening/closing unit to be closed is closed without immediately gating on the inverter 4 (step ST302). Thereafter, the inverter 4 is gated on (step ST303).

According to the processing sequence illustrated in FIG. 17, at the gate-start of the inverter 4, the inverter 4 is gated on after the state of an opening/closing unit is changed in advance, so that inrush current can be prevented from occurring at the motors 70. Further, unintended fluctuations can be prevented from occurring in the total driving force of the motors 70.

In the first to fifth embodiments, the number of motors 70 to be operated and the driving force per motor are calculated, on the basis of the first driving force command input from outside. The number of motors 70 to be operated and the driving force per motor may be calculated, using vehicle position information input from outside.

As described above, when an opening/closing unit is closed, the inverter 4 is desirably temporarily gated off in terms of prevention of inrush current. When an opening/closing unit is opened, the inverter 4 is desirably temporarily gated off in terms of prevention of occurrence of unintended fluctuations in the total driving force of the motors 70. Thus, when the first driving force command is predicted to change on the basis of the presence or absence of a gradient or a curve, it is effective to change the closed or open states of the opening/closing units in advance while the electric vehicle is coasting and the inverter 4 is being gated off.

Specifically, if the number of motors 70 to be operated and the driving force per motor are calculated, using the vehicle position information input from outside, a step of gating off the inverter 4 while driving force is being exerted can be omitted.

Sixth Embodiment

Figure 18:
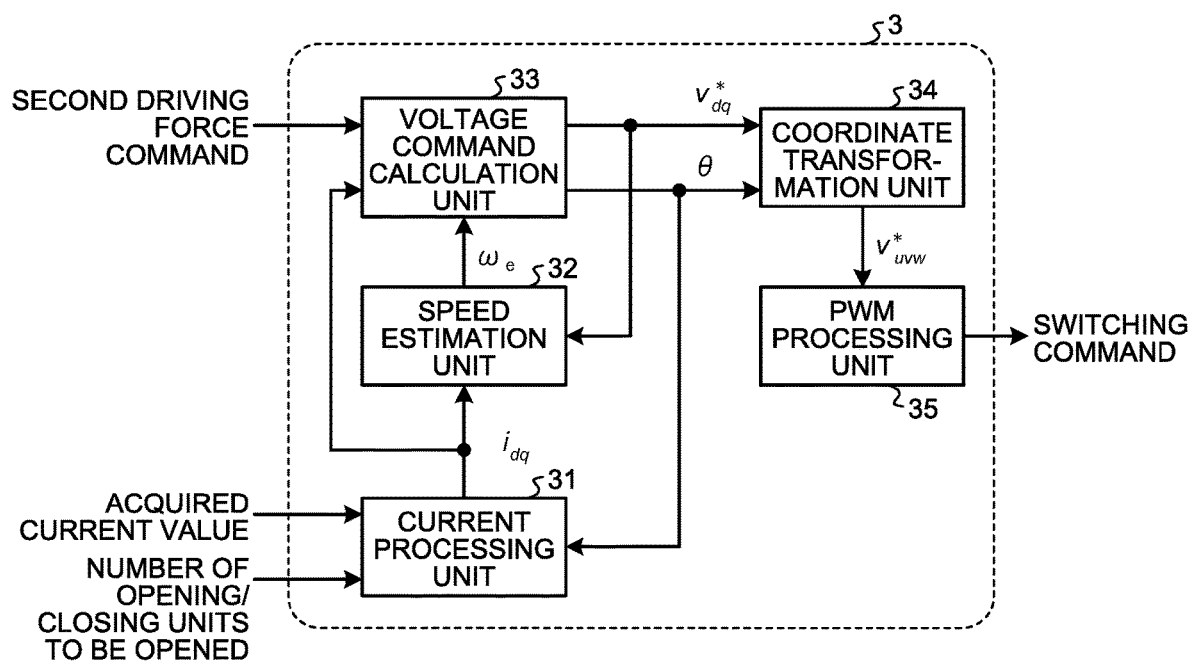
FIG. 18 is a block diagram illustrating the detailed configuration of a voltage control unit in a sixth embodiment.

FIG. 18 is a block diagram illustrating the detailed configuration of the voltage control unit 3 in a sixth embodiment. As illustrated in FIG. 18, the second driving force command, the number of opening/closing units to be opened, and an acquired current value are input to the voltage control unit 3. The second driving force command is generated by the driving force calculation unit 10C of the driving force distribution unit 1. Information on the number of opening/closing units to be opened can be obtained using information on the number of motors to be operated calculated by the operated motor number calculation unit 10B of the driving force distribution unit 1. The acquired current value is a current value acquired from the current detector 5. In place of the information on the number of opening/closing units to be opened, information on the number of opening/closing units to be closed may be acquired.

The voltage control unit 3 includes a current processing unit 31, a speed estimation unit 32, a voltage command calculation unit 33, a coordinate transformation unit 34, and a PWM processing unit 35 as components for performing vector control on the output voltage of the inverter 4 and performing so-called speed sensorless control to estimate rotational frequency from a current value without using a rotation sensor.

The current processing unit 31 calculates a unit current that is a current converted into a current value per motor, on the basis of the acquired current value and the number of opening/closing units to be opened, using the following formula (1).

(Unit current)=(acquired current value)/(number of motors)×(number of opening/closing units)/(number of opening/closing units to be closed)     (1)

The unit current calculated by the current processing unit 31 is converted into a current value $i_{dq}$ of a dq coordinate system on the basis of a voltage phase angle $\theta$ described later, and transmitted to the speed estimation unit 32 and the voltage command calculation unit 33.

The speed estimation unit 32 estimates a speed estimate value $\omega_e$ corresponding to the rotational frequency of the motors 70, on the basis of the current value $i_{dq}$ of the unit current calculated by the current processing unit 31 and a voltage command $v^*_{dq}$ of the dq coordinate system calculated by the voltage command calculation unit 33, and outputs it to the voltage command calculation unit 33.

The voltage command calculation unit 33 calculates the voltage command $v^*_{dq}$ of the dq coordinate system and the voltage phase angle $\theta$ of the dq coordinate system, on the basis of the second driving force command, the current value $i_{dq}$ of the unit current, and the speed estimate value $\omega_e$. The coordinate transformation unit 34 transforms the voltage command $v^*_{dq}$ of the dq coordinate system to a voltage command $v^*_{UVW}$ in a UVW coordinate system using the voltage phase angle $\theta$, and outputs it to the PWM processing unit 35. The PWM processing unit 35 generates a switching command for controlling switching elements (not illustrated) of the inverter 4, on the basis of the voltage command $v^*_{UVW}$, and outputs it to the inverter 4.

The configuration of the voltage control unit 3 illustrated in FIG. 18 is applicable to any of the electric-vehicle propulsion control systems 50 to 50D illustrated in the above-described first to fifth embodiments. By its application to each of the electric-vehicle propulsion control systems 50 to 50D of the first to fifth embodiments, a control system performing speed sensorless control can also have the effects obtained in the first to fifth embodiments.

Finally, a hardware configuration for implementing the functions of the driving force distribution unit 1, the opening/closing control unit 2, and the voltage control unit 3 in the first to sixth embodiments will be described with reference to the drawings in FIGS. 19 and 20.

Figure 19:
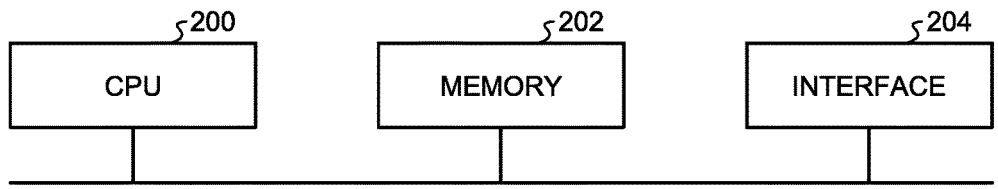
FIG. 19 is a block diagram illustrating an example of a hardware configuration that implements the functions of the driving force distribution unit, an opening/closing control unit, and the voltage control unit in the first to sixth embodiments.

To implement part or all of the above-described functions of the driving force distribution unit 1, the opening/closing control unit 2, and the voltage control unit 3, as illustrated in FIG. 19, a configuration including a Central Processing Unit (CPU) 200 for performing calculation, a memory 202 in which programs read by the CPU 200 are stored, and an interface 204 for inputting and outputting signals may be used. The CPU 200 may be an operating unit such as a microprocessor, a microcomputer, a processor, or a Digital Signal Processor (DSP). The memory 202 corresponds to a nonvolatile or volatile semiconductor memory such as a Random Access Memory (RAM), a Read Only Memory (ROM), a flash memory, an Erasable Programmable ROM (EPROM), or an Electrically EPROM (EEPROM).

Specifically, the memory 202 stores programs for executing part or all of the functions of the driving force distribution unit 1, the opening/closing control unit 2, and the voltage control unit 3. The CPU 200 performs various kinds of arithmetic processing described in the first to sixth embodiments by transmitting and receiving necessary information through the interface 204.

Figure 20:
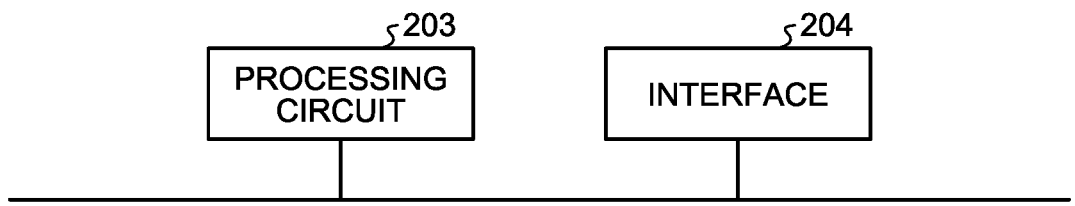
FIG. 20 is a block diagram illustrating another example of the hardware configuration that implements the functions of the driving force distribution unit, the opening/closing control unit, and the voltage control unit in the first to sixth embodiments.

The CPU 200 and the memory 202 illustrated in FIG. 19 may be replaced by a processing circuit 203 as illustrated in FIG. 20. The processing circuit 203 corresponds, for example, to a single circuit, a combined circuit, a programmed processor, a parallel-programmed processor, an Application Specific Integrated Circuit (ASIC), a Field-Programmable Gate Array (FPGA), or a combination of them.

The configurations illustrated in the above embodiments illustrate an example of an aspect of the present invention, and can be combined with another known art, and can be partly omitted or changed without departing from the scope of the present invention.

REFERENCE SIGNS LIST 1 driving force distribution unit; 2 opening/closing control unit; 3 voltage control unit; 4 inverter; 5 current detector; 6, 6a, 6b, 6c, 6d, 6e, 6f opening/closing unit; 6A, 6B, 6C contactor; 8 idling detection unit; 10A selective powering enabling/disabling determination unit; 10B operated motor number calculation unit; 10C driving force calculation unit; 31 current processing unit; 32 speed estimation unit; 33 voltage command calculation unit; 34 coordinate transformation unit; 35 PWM processing unit; 50, 50A, 50B, 50C, 50D electric-vehicle propulsion control system; 70 motor; 72 axle; 75 rotation sensor; 80 bogie; 200 CPU; 202 memory; 203 processing circuit; 204 interface.

The invention claimed is:

1. An electric-vehicle propulsion control system, comprising:
a plurality of induction motors;
an inverter to apply a common voltage to the plurality of induction motors;
at least one switch to enable switching between electrical opening and conduction between the inverter and at least one of the induction motors;
an opening/closing controller to control electrical opening and conduction state of the switch, wherein the opening/closing controller switches the switch between electrical opening and conduction state, on a basis of number of the induction motors to be operated; and
a driving force distributor to calculate the number of the induction motors to be operated and a driving force per induction motor on a basis of either a driving force command input from outside or vehicle position information input from outside.

2. The electric-vehicle propulsion control system according to claim 1, wherein the switch is disposed for all the induction motors to enable individual control of electrical opening and conduction state.

3. The electric-vehicle propulsion control system according to claim 1, wherein the switch comprises at least two contactors to switch any of phases of power lines having three phases of the induction motor between electrical opening and conduction state, and the at least two contactors are configured to enable collective switching between electrical opening and conduction state.

4. The electric-vehicle propulsion control system according to claim 2, further comprising:
an idling detector to detect idling of the induction motors, wherein
the opening/closing controller switches the switch between electrical opening and conduction state on a basis of an output of the idling detector.

5. The electric-vehicle propulsion control system according to claim 2, further comprising:
a current sensor disposed to obtain a total value of current flowing through the plurality of induction motors; and
a voltage controller to calculate an output voltage of the inverter by vector control, wherein
the voltage controller comprises a current processor to calculate a unit current obtained by converting a current value acquired from the current sensor into a current value per induction motor on a basis of a following formula:

(Unit current)=(sensor-acquired value)/(number of induction motors)×(number of switches)/(number of switches to be closed).

6. The electric-vehicle propulsion control system according to claim 5, wherein the voltage controller calculates the output voltage of the inverter by speed sensorless vector control, and comprises a speed estimator to estimate a rotational speed of the induction motors on a basis of the output of the current processor.

7. The electric-vehicle propulsion control system according to claim 3, further comprising:
an idling detector to detect idling of the induction motors, wherein
the opening/closing controller switches the switch between electrical opening and conduction state on a basis of an output of the idling detector.

8. The electric-vehicle propulsion control system according to claim 1, further comprising:
an idling detector to detect idling of the induction motors, wherein
the opening/closing controller switches the switch between electrical opening and conduction state on a basis of an output of the idling detector.

9. The electric-vehicle propulsion control system according to claim 3, further comprising:
a current sensor disposed to obtain a total value of current flowing through the plurality of induction motors; and
a voltage controller to calculate an output voltage of the inverter by vector control, wherein
the voltage controller comprises a current processor to calculate a unit current obtained by converting a current value acquired from the current sensor into a current value per induction motor on a basis of a following formula:

(Unit current)=(sensor-acquired value)/(number of induction motors)×(number of switches)/(number of switches to be closed).

10. The electric-vehicle propulsion control system according to claim 1, further comprising:
a current sensor disposed to obtain a total value of current flowing through the plurality of induction motors; and
a voltage controller to calculate an output voltage of the inverter by vector control, wherein
the voltage controller comprises a current processor to calculate a unit current obtained by converting a current value acquired from the current sensor into a current value per induction motor on a basis of a following formula:

(Unit current)=(sensor-acquired value)/(number of induction motors)×(number of switches)/(number of switches to be closed).

11. The electric-vehicle propulsion control system according to claim 9, wherein the voltage controller calculates the output voltage of the inverter by speed sensorless vector control, and comprises a speed estimator to estimate a rotational speed of the induction motors on a basis of the output of the current processor.

12. The electric-vehicle propulsion control system according to claim 10, wherein the voltage controller calculates the output voltage of the inverter by speed sensorless vector control, and comprises a speed estimator to estimate a rotational speed of the induction motors on a basis of the output of the current processor.

\* \* \* \* \*